United States Patent [19]

Bohla et al.

[11] 4,401,197
[45] Aug. 30, 1983

[54] DRUM BRAKE

[75] Inventors: David J. Bohla, Lakeview, Ohio; Leonard R. Elliott, Redford Township, Wayne County, Mich.

[73] Assignee: Rockwell International Corporation, Pittsburgh, Pa.

[21] Appl. No.: 268,605

[22] Filed: May 29, 1981

[51] Int. Cl.³ ............................................ F16D 51/30
[52] U.S. Cl. ................................. 188/334; 188/250 B; 188/326
[58] Field of Search ................ 188/78, 325, 326, 328, 188/334, 363, 250 A, 250 B, 250 G, 196 M, 196 R, 331

[56] References Cited

U.S. PATENT DOCUMENTS

| | | | |
|---|---|---|---|
| 1,847,389 | 3/1932 | Fawick | 188/250 G X |
| 1,891,723 | 12/1932 | Novack | 188/250 G X |
| 1,917,993 | 7/1933 | Morris | 188/250 G |
| 2,282,439 | 5/1942 | Tilden | 188/78 |
| 2,495,074 | 1/1950 | Mossey | 188/363 |

Primary Examiner—Duane A. Reger

[57] ABSTRACT

An improved drum brake is of the type which includes a pair of actuators with a pair of arcuate brake shoes extending therebetween. Each brake shoe is capable of limited movement along a path between the actuation end of one of the actuators and the anchor end of the other of the actuators. The wheel and drum of the drum brake rotate in a normal direction from the actuation end of one actuator to the anchor end of the other actuator so that a leading end of each brake shoe is adjacent the actuator end and a trailing end of each brake is adjacent the anchor end. The improvement includes providing a lining on each of the brake shoes which has a useable layer thereof which is thicker at the trailing end of the brake shoe than at the leading end of the brake shoe. The brake shoe is relatively located on the path toward the actuation end prior to wear of the useable layer and tends to be relocated along the path away from the actuation end during wear of the useable layer throughout use of the drum brake.

5 Claims, 2 Drawing Figures

DRUM BRAKE

BACKGROUND OF THE INVENTION

1. Field of the Invention

This invention relates to an improved drum brake and, more specifically, to such a brake having a pair of floating brake shoes, each of which has a lining including a useable layer thereof which is thicker at the trailing end during normal drum rotation than it is at the leading end.

2. Description of the Prior Art

Drum brakes have heretofore been extensively used for the wheels which are rotatably mounted on the axles of heavy duty vehicles. The drums are mounted for rotation with the wheels and a brake spider is mounted on the axle to include some form of actuation means for a pair of arcuate brake shoes to cause them to be brought into frictional engagement with the opposite sides of the interior surface of the drum. Many types of actuation means and many methods of mounting the brake shoes have been successfully utilized in the past.

Because it is desirable for the brake shoe lining to be brought into proper and full contact with the interior of the drum throughout its life, one type of drum brake includes brake shoes which are capable of "floating" during brake operation. Neither end of a floating brake shoe is mounted on a pivot pin or other means which would restrict it movement throughout the life of the brake shoe lining. Although one prior art drum brake utilizing such floating brake shoes has been satisfactorily employed in heavy duty trucks and trailers, it has been found that its use in bus or coach installations has resulted in uneven wear of the useable lining thereof even though the braking function has worked satisfactorily throughout the use of the lining. The useable lining was designed to be thicker in the intermediate region of the shoe rather than at its ends. Such a lining is well known in the brake art as, for example, can be seen in U.S. Pat. Nos. 2,167,607; 2,213,003 and 2,381,737.

However, although there was considerable wear in the intermediate region of these prior art brake shoes after repeated braking in a normal direction of rotation of the wheel and drum, the useable layer was found to be initially worn away at the trailing end of the shoe with very little wear at the leading end. Apparently, the multiple and frequent braking of such coaches has resulted in a combination of variables which either did not exist in the heavy duty truck and trailer installations or which, if they existed, did so in such an infrequent manner that a similar brake lining wear pattern was not apparent. In any case, although this prior art drum brake efficiently and reliably produces braking for the coaches, the uneven wear on the lining has significantly decreased the effective life of the lining and has increased maintenance problems associated with its replacement.

SUMMARY OF THE INVENTION

It is, therefore, an object of this invention to provide an improved drum brake of the type which utilizes floating brake shoes having a useable lining thereon which is designed to accommodate for uneven wear.

This and other objects of the invention are provided in a preferred embodiment thereof including an improved drum brake for a wheel rotatably mounted on a vehicle axle of the type which includes a drum mounted for rotation with the wheel. A brake spider is mounted on the axle and has a center line and a transverse line perpendicular thereto. A pair of actuator means are mounted at opposite ends of the center line of the brake spider. Each of the actuator means has an actuation end and an anchor end. A arcuate brake shoe extends from the actuation end of each actuator means to the anchor end of the other actuator means. Each of the brake shoes is capable of limited movement along a path generally parallel to the center line of the brake shoe between the actuation end and the anchor end. The wheel and the drum rotate in a normal direction from the actuation end of each actuator means to the anchor end of the other actuator means so that a leading end of each brake shoe is adjacent the actuation end and a trailing end of each brake shoe is adjacent the anchor end. The improvement includes a lining on each brake shoe which has a useable layer thereof which is thicker at the trailing end of the brake shoe than at the leading end of the brake shoe. The brake shoe is relatively located on the path toward the actuation end prior to wear of the useable layer of the lining and tends to be relocated along the path away from the actuation end during wear of the useable lining.

DESCRIPTION OF THE PREFERRED EMBODIMENT

Figure 1:
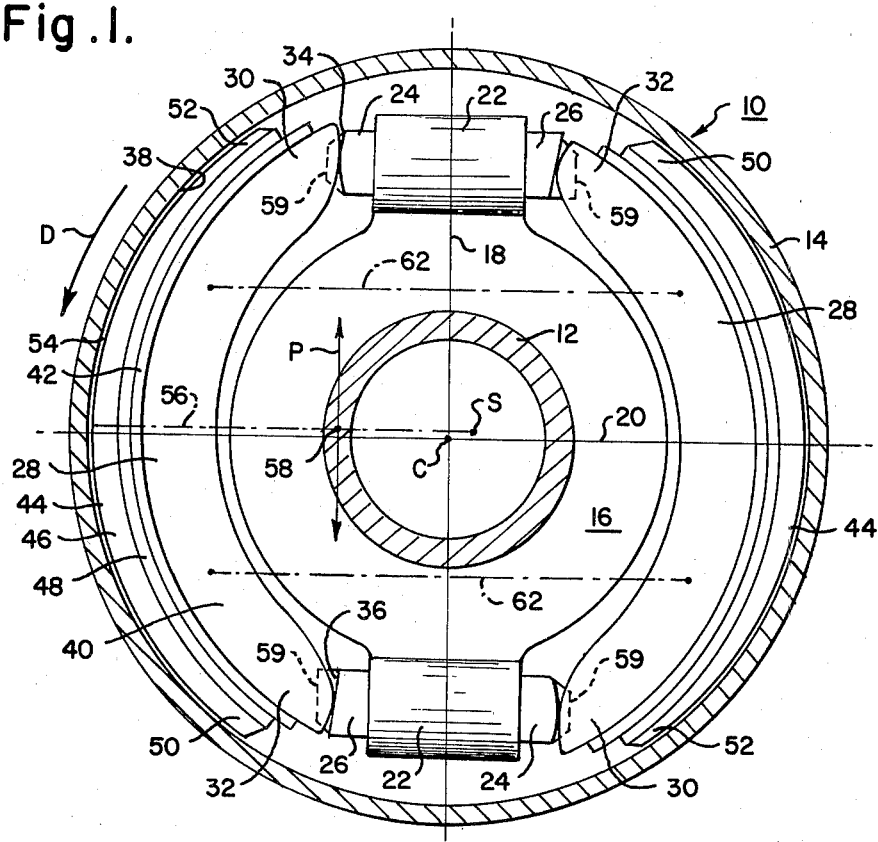
FIG. 1 is an elevational view partially in section of a simplified drum brake prior to any wear of the brake shoe lining thereof including various features of the invention.
Figure 2:
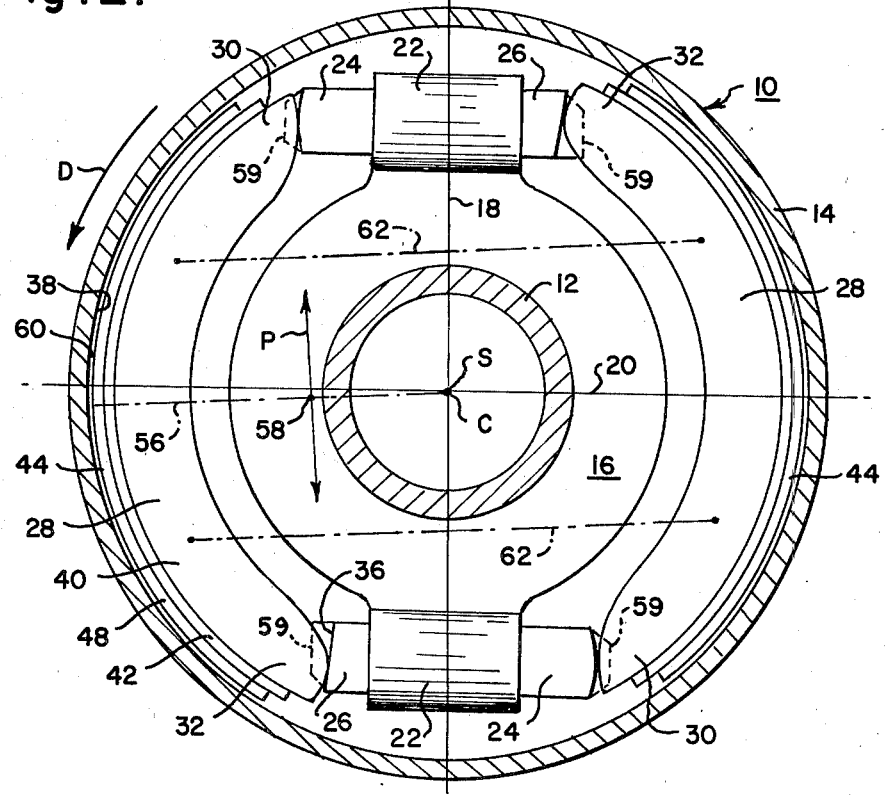
FIG. 2 is an elevational view partially in section of the drum brake shown in FIG. 1 after extensive wear of the useable layer of the lining on the brake shoes.

As seen in FIGS. 1 and 2, the preferred drum brake 10 is for a wheel (not shown) which is rotatably mounted on a vehicle axle 12. A drum 14 is mounted for rotation with the wheel and a brake spider 16 is rigidly mounted on the axle 12 to include a center line 18 and a transverse line 20 which is perpendicular thereto. The center line 18 and transverse line 20 cross at a center C of the axle and the wheel and drum. A pair of actuator means 22 is mounted at the opposite ends of the center line 18 with each actuator means 22 including a actuation end 24 and an anchor end 26.

An arcuate brake shoe 28 extends from the actuation end 24 of each of the actuator means 22 to the anchor end 26 of the other actuator means 22. Since each brake shoe 28 is of the "floating" type, the first end 30 and the second end 32 thereof are capable of respectively making sliding contact with the contacting surface 34 of the actuation end 24 and the contact surface 36 of the anchor end 26. Consequently, since neither end 30 nor 32 of the brake shoe 28 is rigidly retained or firmly anchored at a anchor pin or other means for producing pivotal movement of the brake shoe, each brake shoe is capable of limited movement along the path generally between the actuation end 24 and the anchor end 26. As mentioned herebefore, this limited movement is intended to insure that a lining on the brake shoe 28 is capable of being brought into a uniform contact with the interior surface 38 of the drum 14 throughout the life of the lining and throughout the use of the drum brake 10. Drum brakes with floating brake shoes have been satisfactorily employed in the past and do effectively generate sufficient frictional contact for proper braking of the vehicle.

As shown in FIGS. 1 and 2, the brake 10 is arranged for a wheel rotation and therefore a drum rotation which is normally in the direction as indicated by the arrow D. As a result, the drum 14 will tend to rotate from the actuation end 24 of each actuator means 22 to the anchor end 26 of the other actuator means 22. As a result, the first end 30 of each brake shoe 28 is the leading end thereof and the second end 32 of each brake shoe 28 is the trailing end thereof.

The preferred brake 10 utilizes a wedge operated actuator means 22 of the type which is well known in the brake art. There is included a means for applying pressure to a wedge (not shown) within the body of the actuator means 22 which can then transmit pressure to the actuation end 24 to cause movement of the brake shoe 28. Specifically, in this brake, the anchor end 26 of each actuator means 22 is a rigid portion thereof which will remain stationary throughout the life of the brake 10. However, it should be recognized that there are some dual wedge actuator means which cause a wedge to be introduced between oppositely mounted end elements which are capable of movement within the actuator means body. Wedges of this type are usually designed to be "floating" so that the separating force applied between the two end elements will be capable of being applied to whichever end element is best able to move relative to the spider. For example, as shown in FIG. 1, if the actuator means 22 therein were a dual wedge type, the actuator end 24 would be the end thereof which actually moves to cause the brake shoe to be outwardly positioned. The rotation in the direction D would generally oppose and resist any movement of a "movable" anchor end 26 so that the operation of the actuator means of this type would be very similar to the operation of the actuator means 22 shown in FIG. 1. Accordingly, when referring to an actuation end and an anchor end in the specification and claims hereof, it should be kept in mind that the anchor end 26 need not be permanently and rigidly prevented from movement.

In fact, if the ends of the actuator means 22 were reversed with the same normal direction of rotation D, the brake would still operate although not as efficiently. There have been some prior art brakes which have included an actuation end at the trailing end of a brake shoe even though the braking force in this configuration is not as efficient. Therefore, even though there has been made specific reference to the actuation end and the anchor end in the claims, these two terms could be directly substituted one for the other without departing from the invention as claimed as long as the brake shoe 28 is a "floating" type as described and the normal direction of rotation D is properly used to determine which end of the brake shoe 28 is the trailing end and which end is the leading end.

Further in this regard, it should be recognized to those skilled in the brake art that there are still other means for producing actuation of such brake shoes 28. Again, there is nothing in the invention to prevent another form of actuator means from being utilized as long as the floating concept of the brake shoe 28 exists. In other words, the actuator means could include some type of device for applying a force at one end of the shoe and any form of anchor at the other end. For example, an anchoring means could be rigidly mounted to the spider 16 rather than a body which includes a wedge operator and would still serve as the anchor end for an actuator means.

There is still another feature of the preferred actuator means 22 which should be discussed. Specifically, as can be seen by comparing FIGS. 1 and 2, the actuation end 24 is shown in one position prior to any effective wear of the lining of the brake shoe 28 and is shown in yet another position after significant wear of the lining. Most actuator means for such brakes include some means of "slack adjusting". The preferred embodiment includes such a slack adjuster although it is not specifically shown therein. These slack adjusters are well know in the brake art and are provided in various forms for the purpose of compensating for the position of the brake shoe 28 as the lining thereof is worn away. It is obviously desirable for the lining to be brought into contact with the interior surface 38 of the drum 14 with as little movement as possible and therefore these slack adjusters are intended to periodically reposition the actuation end 28 throughout the life of the lining so that the application of force to the brake shoe 28 will be most efficient.

Returning to the preferred embodiment, the brake shoe 28 is preferably of the dual web type which includes a parallel pair of webs 40 which are rigidly joined at a central axial location on an arcuate table 42. A lining 44 is mounted on the table 42 to provide the surface which will actually make frictional contact with the interior surface 38 of the drum 14. Although the lining 44 is shown to be in one piece to extend circumferentially about the table 42, it is well known that linings of this type can be provided in pad form and that one or more such pads could be utilized to cover the circumferential surface of the table 42. Therefore, although only one such pad is used in the preferred embodiment, it should be clear that reference to the lining hereinbelow could easily include a lining which is formed of two or more such pads.

The lining 44 is composed of a useable layer 46 and an attachment layer 48 therebelow. As will be made clear hereinbelow, the design of the brake should be such that wear of the lining 44 would be limited to the useable layer 46 so that the lining should be replaced prior to any wear of the attachment layer 48. Accordingly, as mentioned hereinabove, it is undesirable to have extensive and most significant wear at only one region of the useable layer 46 since there would remain additional material which is capable of producing frictional contact with the interior surface 38 of the drum 14 which would be wasted by the early replacement of such a lining. The attachment layer 48 is usually made of a different material and there might be included recessed holes in the useable layer 46 to allow bolt or rivet means to be located within the attachment layer 48 to extend therethrough and through the table 42 for securing the lining thereto. On some occasions, the attachment layer 48 is again made of a different material but is primarily intended to provide a basis for the application of a bonding material to directly bond the liner 44 to the table 42 without the need of bolts or rivets. Usually such an attachment layer 48 has a uniform thickness as it extends around the circumferential surface of the table 42.

Accordingly, any variation in the thickness of the lining 44 for the purposes of providing material at a region thereof which is to accommodate uneven wear will be limited to the useable layer 46 since the design of the lining 44 would not contemplate any wear in the attachment layer 48. As seen in FIG. 1, the center region of the useable layer 46 of the preferred lining 44 is generally thickened in the manner described hereinabove in U.S. Pat. Nos. 2,167,607; 2,213,003 and 2,381,737 to accommodate for the fact that the application of force to the brake shoe 28 is generally along the transverse line 20 and that the thickness of the useable layer 46 in this region must be able to accommodate the movement of the shoe in this direction throughout the life of the useable layer 46. However, as seen in FIG. 1, the preferred lining 44 includes a useable layer 46 which is thicker at the end 50 thereof associated with the trailing end 32 of the brake shoe 28 than it is at its end 52 which is located at the leading end 30 of the brake shoe 28. As a result, the brake 10 includes a brake shoe 28 which is capable of floating and has a liner 44 thereon which includes a useable layer 46 which will provide additional useable material where needed at the trailing end of the brake shoe 32 rather than at the leading end 30 thereof. The improved brake 10 may now satisfactorily accommoate the uneven wearing condition which was experienced when the prior art brake was operated in a normal direction D over an extended period of time. The uneven wearing of the useable liner 46 does not prevent effective operation of the brake 10 but simply insures that the lining 44 thereon is more efficiently used and that the lining will not have to be prematurely replaced because the useable layer 46 is worn away at a single location thereon while used material remains unused at other locations in the layer 46.

To provide a thicker end 50 than the end 52 for the useable layer 46 of the lining 44, the improved brake 10 requires that the brake shoe 28 be by design relocated within the interior of the drum 14 to accommodate for the change in thickness. Generally, it can be said that it is desirable for the lining 44 to generally have an outside surface which is comparable to the inside surface 38 of the drum 14 and that this condition should exist throughout the use of the useable layer 46. In order to explain the relative location of the brake shoe 28 throughout the effective life of the useable layer 46, the brake shoe 28 shown in the left of FIGS. 1 and 2 will be primarily discussed. Since each brake shoe 28 would react the same during operation in the normal direction D of the brake drum 14, the explanation for the brake shoe 28 at the left of FIGS. 1 and 2 will also be applicable for the other brake shoe 28.

In the simplified version of the preferred brake 10 as shown in FIG. 1, the lining 44 is centrally located away from the interior surface 38 of the drum 14 by a uniform gap 54. Consequently, as will be made clear hereinbelow, the center of the interior surface 38 of the drum 14 lies at the center C and, similarly, the center of the outside surface of the unused, useable layer 46 lies at the center C. However, in order to later present a corresponding surface to the interior surface 38 after effective use of the useable layer 46, the outside surface of the attachment layer 48 has a comparable radius and this radius is initially located at the center S which is to the right of the center C. Since the attachment layer 48 has a uniform thickness, the center S also serves as the center for the table 42 and the brake shoe 28 thereof. Additionally, and more significantly, the center line 56 of the brake shoe 28 is located above the transverse line 20 in order to initially accommodate for the fact that the end 50 is thicker than the end 52 of the useable layer 46. Therefore, although the brake shoe 28 will be expected to experience some movement along a path P between the actuation end 24 and the anchor end 26 throughout the life of the useable lining 46 because it is a "floating" shoe, the initial location of the brake shoe 28 along the path P is shown by the dot 58 where the center line 56 crosses the path P. In the preferred embodiment shown in FIG. 1, the path P is parallel to the center line 56 and is primarily parallel because the simplified embodiment of the invention in the form of brake 10 initially includes a actuation end 24 and an anchor end 26 which evenly extend from the body of the actuator means 22 so that each end of the brake shoe 28 is the same distance from the center line 18. Similarly, the transverse line 20 can be seen to generally bisect the outer surface of the useable layer 46 of the lining 44. However, it will not bisect the shoe 28 itself since the position as mentioned hereinabove is initially toward the anchor end 24 by design to accommodate for the useable layer 46 being thicker at the trailing end 32 of the shoe 28.

In another embodiment of the invention, the center line 18 might be relocated to not directly lie upon the geometrical center of the spider 16 but rather to be initially spaced evenly between the actuation end 24 and the anchor end 26 of each actuator means 22. If the center line 18 were located in this manner, the same explanation hereinabove would be more or less applicable even if, for example, the actuation end 24 were to extend more significantly from the body of the actuator means 22 to accommodate for a slack adjuster on the exterior portion thereof. A corresponding relocation of the transverse line 20 to be perpendicular to the center line 18 would again result in the same relative location of the brake shoe 28 as is shown in the preferred embodiment in FIG. 1.

However, relocation of the shoe 28 has not been accomplished without redesign of a prior art brake having a pair of floating shoes. Even though the prior art brake included shoes which were capable of limited movement along the path P, the position required by the present invention would normally have been beyond such limits. For example, to generally retain the shoes 28 from undesired axial movement, the actuation ends 24 and the anchor ends 26 include central extensions 59 which are located between the webs 40 of the shoes 28. The extensions 59 of the prior art brake were found to interfere with relocation of the shoes 28 and had to be redesigned to allow the shoes 28 to be initially positioned as shown in FIG. 1. Redesign of other prior art brakes having floating shoes to accommodate a unique initial positioning of the shoes as required by the present invention would not be unexpected.

Referring to FIG. 2, it can be seen that the simplified version of the invention in the form of the preferred brake 10 is shown with the useable layer 46 completely used and, therefore, shows the condition of the brake 10 just prior to replacement of the lining 44. As mentioned hereinabove, as the useable layer 46 is used, the slack adjuster associated with the actuation end 24 will cause it to be further extended outwardly from the body of the actuator means 22 to cause the shoe 28 to be circumferentially reoriented relative to the spider 16. Consequently, the movement of the shoe 28 after effectively using up the useable layer 46 is demonstrated by the fact that the center S of the brake shoe 28 is relocated to generally coincide with the center C. Additionally, the path P has assumed a new position to the left since it is by definition between the actuation end 24 and the anchor end 26. For demonstration purposes again in FIG. 2, there is included a relatively uniform gap 60 between the interior surface 38 of the drum 14 and the exterior surface of the attachment layer 48 of the lining 44. This is comparable to the gap 54 as shown in FIG. 1 so that the location of the brake shoe 28 can be directly compared to its location in FIG. 1.

It can now be seen that the center line 56 of the brake shoe 28 is relocated and that the point 58 is now moved along the path P to be below the transverse line 20. A comparision of the point 58 in FIGS. 1 and 2 is included to demonstrate the relative movement of the brake shoe 28 and is not intended to specifically show the exact location of the brake shoe 28 initially in the brake 10 and later when the useable layer has been effectively used. However, it can be said that the brake shoe 28 is relatively located on the path P toward the actuation end 24 prior to wear of the useable layer 46 and tends to be relocated along the path P away from the actuation end 24 during wear of the useable layer 46. This qualification to the explanation provided hereinabove is necessary because the simplified version as shown in FIGS. 1 and 2 is considered the best means for demonstrating the relative movement of the brake shoe 28 within such a brake without intending to show its exact position in an operating brake. Therefore, it is appropriate to provide various dimensions of an operating brake and to explain various features included in such a brake by those skilled in the art to enable one to actually provide a brake according to the invention. It should be kept in mind, however, that the explanation provided hereinbelow should not detract from the explanation provided hereinabove regarding the relative movement of the shoes but will only further aid one skilled in the art to provide the invention as claimed.

In one drum brake installation utilizing the improvements of the present invention, a new, unworn drum 14 has an interior surface 38 with a diameter of 15.125 inches for a radius of 7.563 inches. The radius of the outside surface of the lining 44 is 7.543 inches. The slack adjuster would be set to establish a gap therebetween of approximately 0.020 inches if the drum 14 and outside surface of the lining were both coincentric with the center C and the gap 54 were evenly spaced therebetween. The new lining 44 has a thickness at the leading end 30 of the brake shoe 28 which is approximately 0.550 inches, a center region adjacent the transverse line 20 would have a thickness of approximately 0.753 inches and the portion adjacent the trailing end 32 of the brake shoe 28 would have a thickness of 0.656 inches. With the lining 44 being provided an attachment layer 48 of approximately 0.250 inches, it can be seen that the useable layer 46 would have a thickness of about 0.300 inches at the end 52, 0.503 inches in the center region and 0.406 inches at the end 50. The radius of the outside surface of the table 42 of the shoe 28 would be about 7.293 inches.

An analysis of these dimensions would reveal that the center of the shoe 28 shown to the left in FIG. 1 would have a center S which lies approximately 0.503 inches to the right of the center C. Additionally and more significantly, the center S would be above the transverse line 20 including the center C by a distance of approximately 0.090 inches.

It should be noted that the initial radius of the outside surface of the lining is less than the initial radius of the interior surface 38 of the drum 14. This is intended, by design, to insure that there will be center contact between the lining and the interior surface of the drum rather than there being initially toe to heel contact therebetween which has been found to be detrimental to overall brake operation. Further, although the gap 54 is shown in FIG. 1 and has been implied to be generally uniform between the outside surface of the lining 44 and the interior surface 38 of the drum 14, this would not be the case once the brakes are actuated after initial installation. In fact, the brake shoe 28 would tend to move toward the anchor end 28 with the normal direction of rotation as indicated by D. Although there would be some gap at the trailing end 32, the actual gap would be almost immeasurable. It can be seen that this might affect the location of the center S of the brake shoe 28 but the explanation provided hereinabove is accurate for showing the relative location of the center of the brake shoe 28 as represented by the point 58 along path P. Additionally, although the discussions hereinabove have been primarily directed to operation in a normal direction D, it should be clear that the brake 10 will operate for rotation in the opposite direction. After such an operation, the shoe would in fact assume a position toward the actuation end 24 with there being an almost immeasurable gap between the "leading" end 30 and the interior surface 38 of the drum 14. This type of movement which is not determined by the wear of the lining 44 during braking condition is simply the type of movement which is expected of this type of "floating" shoe configuration. Although there are included springs 62 coupling the shoes 28 which would tend to insure that some gap does exist between the outside surface of the lining 44 and the interior surface 38 of the drum 14, they are not expected to have sufficient force to specifically center the gap as generally represented by the gap 54 in FIG. 1.

Similarly, as shown in FIG. 2, there is a gap 60 which is represented as being uniform between the outside surface of the lining and the interior surface 38 of the drum 14. Again, this uniform gap is shown for demonstration purposes only since the "floating" brake shoe would similarly be expected to be positioned toward the anchor end 28 after each occasion in which the brake 10 is utilized to brake the vehicle when traveling in the normal direction D or toward the actuation end after use in the other direction.

The lining 44 is shown with no useable layer 46 remaining thereon and would, therefore, appear to have a radius of approximately 7.543 inches which would be consistent with the radius of the outside surface of the attachment layer 48. However, as the useable layer 46 is being worn, there would also be wear of the interior surface 38 of the drum 14 so the actual radius of the lining 44 would now be consistent with the eventual radius of the interior surface 38 of the drum 14 according to how much it has been worn by extension braking. Although the actual value of the radius in this situation would be dependent on a number of factors, the present invention nevertheless includes means for generally insuring that there would not be a significant variation in the amount of the useable layer 46 which remains at any particular location along the outside surface of the attachment layer 48.

It should be clear to those skilled in the art that additional alterations may be made to the preferred embodiment of the invention without departing from the invention as claimed.

We claim:

1. An improved drum brake for a wheel rotatably mounted on a vehicle axle of the type which includes a drum mounted for rotation with said wheel, a brake spider having a center line and a transverse line perpendicular thereto, said spider being mounted on said axle and having a pair of actuator means mounted at opposite ends of said center line of said brake spider, each said actuator means having an actuation end and an anchor end, an arcuate brake shoe extending from said actuation end of each said actuator means to said anchor end of the other said actuator means, each said brake shoe being capable of limited movement along a path generally parallel to said center line of said brake spider between said actuation end and said anchor end, said wheel and said drum rotating in a normal direction from said actuation end of each said actuator means to said anchor end of said other actuator means so that a leading end of each said brake shoe is adjacent said actuation end and a trailing end of each said brake shoe is adjacent said anchor end, wherein said improvement comprises:

a lining on each said brake shoe which has a useable layer thereof which is thicker at said trailing end of said brake shoe than at said leading end of said brake shoe; and said brake shoe being relatively located on said path toward said actuation end prior to wear of said useable layer of said lining and tending to be relocated along said path away from said actuation end during wear of said useable layer of said lining throughout the life of said drum brake.

2. The improved drum brake as set forth in claim 1, wherein said useable layer is thicker in a region thereof adjacent said transverse line of said spider than at said trailing end and said leading end of said brake shoe.

3. The improved drum brake as set forth in claim 1, wherein said lining includes an attachment layer joined to said useable layer for securing said lining to said brake shoe.

4. The improved drum brake as set forth in claim 3, wherein said attachment layer has a uniform thickness.

5. The improved drum brake as set forth in claim 4, wherein said lining has an overall thickness which is greater adjacent said transverse line of said spider than at said trailing end and said leading end of said brake shoe.

* * * * *